(12) United States Patent
Lambord

(10) Patent No.: US 12,027,141 B2
(45) Date of Patent: Jul. 2, 2024

(54) ACTIVITY-FOCUSED DISPLAY SYNCHRONIZATION

(71) Applicant: Synaptics Incorporated, San Jose, CA (US)

(72) Inventor: Tony David Lambord, Huntingdon (GB)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 18/053,525

(22) Filed: Nov. 8, 2022

(65) Prior Publication Data

US 2023/0206884 A1 Jun. 29, 2023

Related U.S. Application Data

(60) Provisional application No. 63/293,924, filed on Dec. 27, 2021.

(51) Int. Cl.
*G09G 5/393* (2006.01)
*G06F 3/01* (2006.01)
(Continued)

(52) U.S. Cl.
CPC ............ *G09G 5/393* (2013.01); *G06F 3/013* (2013.01); *G06F 3/1431* (2013.01); *G09G 5/006* (2013.01);
(Continued)

(58) Field of Classification Search
CPC ........ G09G 5/393; G09G 5/006; G09G 5/001; G09G 5/395; G09G 5/12;
(Continued)

(56) References Cited

U.S. PATENT DOCUMENTS 10,497,295 B1 * 12/2019 Jia .................. G02B 27/017
2012/0169828 A1 * 7/2012 Lee .................... H04L 65/80
348/14.02
(Continued)

FOREIGN PATENT DOCUMENTS

CN 109413480 A 3/2019
CN 112203034 A 1/2021

OTHER PUBLICATIONS

Combined Search and Examination Report, dated Jun. 16, 2023, from Great Britain Application No. 2218739.7, pp. 1-5.

*Primary Examiner* — Brent D Castiaux
(74) *Attorney, Agent, or Firm* — Paradice & Li LLP

(57) ABSTRACT

This disclosure provides methods, devices, and systems for data synchronization. The present implementations more specifically relate to adjusting a rate at which display updates are output to a digital display based on an activity level associated with the digital display. For example, digital displays that render images with relatively little motion or user engagement may be associated with lower activity levels, whereas digital displays that render images with more significant motion or user engagement may be associated with higher activity levels. In some aspects, an adaptive display interface may dynamically increase the rate at which display frames are output to a display when the activity level increases and may dynamically decrease the rate at which display frames are output to the display when the activity level decreases.

18 Claims, 7 Drawing Sheets

(51) Int. Cl.
*G06F 3/14* (2006.01)
*G09G 5/00* (2006.01)

(52) U.S. Cl.
CPC . *G09G 2340/0435* (2013.01); *G09G 2354/00* (2013.01); *G09G 2360/04* (2013.01); *G09G 2360/18* (2013.01)

(58) Field of Classification Search
CPC ....... G09G 2340/0435; G09G 2354/00; G09G 2360/04; G09G 2360/18; G09G 2360/06; G09G 2360/08; G09G 2350/00; G09G 2352/00; G09G 2370/20; G06F 3/013; G06F 3/1431; H04N 7/0127
See application file for complete search history.

(56) References Cited

U.S. PATENT DOCUMENTS

| | | | |
|---|---|---|---|
| 2015/0189126 A1* | 7/2015 | Xie | G09G 5/005 |
| | | | 348/500 |
| 2017/0075416 A1* | 3/2017 | Armstrong | H04N 21/41407 |
| 2018/0082429 A1 | 3/2018 | Choudhury et al. | |
| 2019/0182452 A1 | 6/2019 | Choudha et al. | |
| 2021/0142749 A1* | 5/2021 | Han | G09G 3/3611 |

* cited by examiner

ACTIVITY-FOCUSED DISPLAY SYNCHRONIZATION

CROSS-REFERENCE TO RELATED APPLICATION

This application claims priority and benefit under 35 USC § 119(e) to U.S. Provisional Patent Application No. 63/293,924, filed on Dec. 27, 2021, which is incorporated herein by reference in its entirety.

TECHNICAL FIELD

The present implementations relate generally to digital displays, and specifically to activity-focused display synchronization.

BACKGROUND OF RELATED ART

Many digital display architectures employ a frame buffer to receive and store (or "buffer") pixel data from an image source and a video pipeline to output the buffered pixel data to a digital display. More specifically, the frame buffer aggregates or assembles the received pixel data into display frames and the video pipeline converts the display frames to digital signals for transmission to the digital display. As a result, the image presented on the digital display can be updated (or "refreshed") to reflect each newly received display frame. The rate at which the digital display processes updates is referred to as its "refresh rate," whereas the rate at which display frames are available for output to the digital display is referred to as the "frame rate."

Many digital displays operate at fixed refresh rates. Consequently, the rate at which a video pipeline reads pixel data from a frame buffer must match the refresh rate of the digital display. In some instances, the refresh rate of a digital display may be higher than the associated frame rate. In such instances, the video pipeline may recycle or replay the previous display frame (causing stutter) or may output a partially updated display frame (causing tearing). In other words, the rate at which the video pipeline reads pixel data from the frame buffer must match the refresh rate of the display. Some digital display architectures implement high-bandwidth frame buffers to support such high rates of memory access. However, the hardware cost and power consumption associated with such high-bandwidth frame buffers may be prohibitive for many applications.

A universal docking station (or "dock") is an external display interface that can be used to connect a computing device (such as a notebook computer, mobile phone, or tablet) to one or more digital displays. As such, a universal dock may include its own frame buffer and video pipeline. Universal docks are often used to connect external computing devices to larger displays or multiple displays. However, the frame buffer in a universal dock is often implemented using random access memory (RAM) architectures with relatively limited bandwidth. As a result, the frame rates supported by a universal dock may be substantially lower than the refresh rates of the connected displays.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a method of processing display updates. The method includes steps of receiving first pixel data associated with a first display; aggregating the received first pixel data into a series of first frames; obtaining first activity information indicating an activity level associated with the first display; determining a first target frame rate based at least in part on the first activity information; and outputting the series of first frames to the first display at the first target frame rate.

Another innovative aspect of the subject matter of this disclosure can be implemented in a display synchronization system, including a processing system and a memory. The memory stores instructions that, when executed by the processing system, cause the display synchronization system to receive first pixel data associated with a first display; aggregate the received first pixel data into a series of first frames; obtain first activity information indicating an activity level associated with the first display; determine a first target frame rate based at least in part on the first activity information; and output the series of first frames to the first display at the first target frame rate.

BRIEF DESCRIPTION OF THE DRAWINGS

The present implementations are illustrated by way of example and are not intended to be limited by the figures of the accompanying drawings.

DETAILED DESCRIPTION

Figure 1:
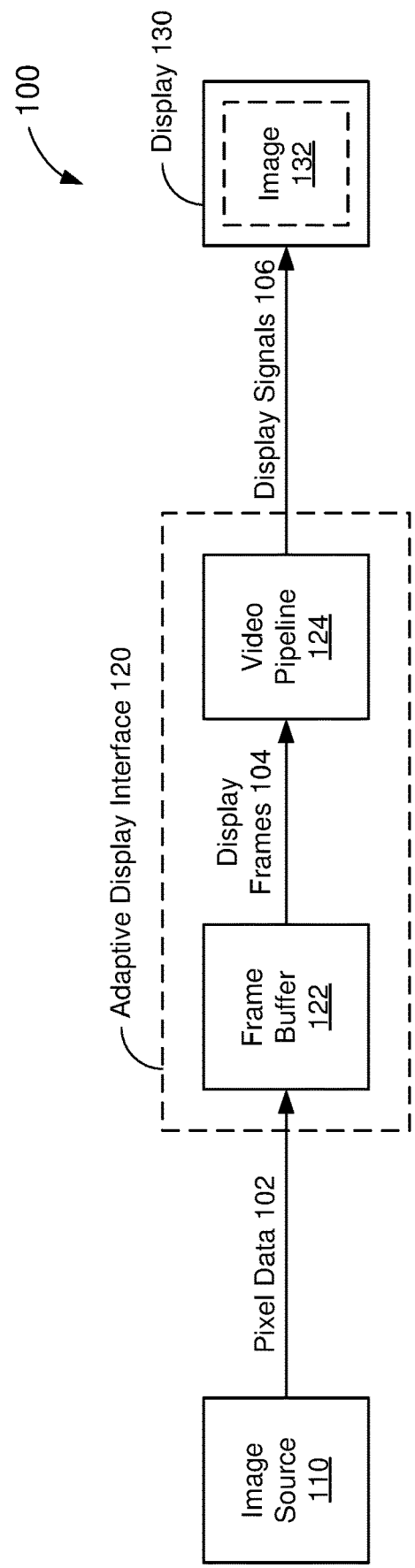
FIG. 1 shows a block diagram of a video display system, according to some implementations.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

Some digital displays are capable of dynamic refresh, which enables a digital display to synchronize its refresh rate to the frame rate associated with the display frames. Example dynamic refresh technologies include variable refresh rate (VRR) and adaptive sync, among other examples. A digital display that supports dynamic refresh may update the displayed image (such as by performing a screen refresh) only when a new display frame is available for output by the video pipeline, thereby avoiding stutter or tearing. By allowing the digital display to adapt its refresh rate to the frame rate, dynamic refresh relaxes the memory access requirements of the display interface. However, in universal dock architectures, the rate at which new display frames become available may exceed the bandwidth of memory reads supported by the frame buffer. Thus, new techniques are needed for processing display updates to improve user experience in resource-constrained environments.

Various aspects relate generally to refreshing digital displays, and more particularly, to dynamically adjusting a rate at which display updates are output to a digital display based on an activity level associated with the digital display. For example, digital displays that render images with relatively little motion or user engagement may be associated with lower activity levels, whereas digital displays that render images with more significant motion or user engagement may be associated with higher activity levels. In some aspects, an adaptive display interface may dynamically increase the rate at which display frames are output to a display when the activity level increases and may dynamically decrease the rate at which display frames are output to the display when the activity level decreases. In some implementations, the adaptive display interface may balance the rates of display updates for multiple displays based on the activity level associated with each display and the bandwidth limitations of the frame buffer.

Particular implementations of the subject matter described in this disclosure can be implemented to realize one or more of the following potential advantages. By dynamically adjusting the rate at which display updates are output to a digital display based on the activity level associated therewith, aspects of the present disclosure may leverage the dynamic refresh capabilities of the display to reduce the overhead associated with memory accesses without sacrificing user experience. For example, when the adaptive display interface receives several frames of static pixel data (with little or no variation between successive display frames), the adaptive display interface can output such display frames to the digital display less frequently than the rate at which such display frames become available with no discernible reduction in image quality. Accordingly, the adaptive display interface of the present implementations can support cheaper hardware (such as lower-bandwidth memory), a greater number of displays, higher display resolutions, or any combination thereof.

FIG. 1 shows a block diagram of a display system 100, according to some implementations. The display system 100 includes an image source 110, an adaptive display interface 120, and a display 130. More specifically, the image source 110 may communicate via the adaptive display interface 120 to update or refresh a digital image on the display 130.

In some aspects, the image source 110, the adaptive display interface 120, and the display 130 may be implemented in (or correspond to) respective devices. For example, the image source 110 may be a computing device (such as a notebook computer, mobile phone, or tablet) and the adaptive display interface 120 may be a universal docking station that can be used to couple the computing device to the display 130. In some implementations, the adaptive display interface 120 may be coupled to the image source 110 via a first communication channel and may be coupled to the display 130 via a second communication channel having a greater bandwidth than the first communication channel.

In some implementations, the first communication channel may be a wired medium. As such, the first communication channel may conform to a Universal Serial Bus (USB) standard, an Ethernet standard (including the Institute of Electrical and Electronics Engineers (IEEE) 802.3 family of standards), or various other wired communication standards. In some other implementations, the first communication channel may be a wireless medium. As such, the first communication channel may conform to a wireless local area network (WLAN) standard (including the IEEE 802.11 family of standards), a Bluetooth® standard (such as defined by the Bluetooth Special Interest Group (SIG)), or various other wireless communication standards. In some implementations, the second communication channel may conform to a high-definition multimedia interface (HDMI) standard, a DisplayPort (DP) standard, or various other computer display standards.

The image source 110 may be any device or component capable of generating pixel data 102 that can be rendered or otherwise displayed by a digital display. For example, the pixel data 102 may include color or brightness values to be driven onto respective pixel elements associated with the display 130. The image source 110 may generate the pixel data 102 by performing various rendering or image processing operations. As a result, the rate at which the pixel data 102 is output by the image source 110 may vary over time (depending on the complexity of the rendering or image processing operations). The adaptive display interface 120 converts the pixel data 102 to display signals 106 that can be interpreted by the display 130. The display 130 may be any digital display device capable of rendering or displaying digital images 132 based on the display signals 106. Example suitable display technologies include light emitting diode (LED), organic LED (OLED), cathode ray tube (CRT), liquid crystal display (LCD), and plasma, among other examples.

The adaptive display interface 120 includes a frame buffer 122 and a video pipeline 124. The frame buffer 122 is configured to store or buffer the pixel data 102 received from the image source 110. More specifically, the frame buffer 122 aggregates (or assembles) the received pixel data 102 into display frames 104. Each display frame 104 may include a set (or "frame") of pixel data 102 indicating the pixel values to be driven onto each pixel element of the display 130 during a respective update or refresh. In other words, each display frame 104 represents a new or updated image 132 to be rendered on the display 130. The video pipeline 124 reads the display frames 104 from the frame buffer 122 and converts each display frame 104 to a respective set of display signals 106. For example, the display signals 106 may include data signals, clock signals, and various other synchronization or control signals that can be used to render the image 132 on the display 130.

In some implementations, the display 130 may support dynamic refresh (such as VRR or adaptive sync). In other words, the display 130 may synchronize its refresh rate with the frame rate associated with the display frames 104. As used herein, the term "frame rate" refers to the rate at which the video pipeline 124 outputs display frames 104 (as display signals 106) to the display 130. Aspects of the present disclosure recognize that, by locking the refresh rate of the display 130 to the frame rate of the display frames 104, dynamic refresh allows the video pipeline 124 to control when the display 130 will refresh the image 132. In other words, the video pipeline 124 has autonomy to decide the frequency with which it reads display frames 104 out from the frame buffer 122 (rather than being constrained by a fixed refresh rate associated with the display 130).

In some aspects, the video pipeline 124 may dynamically adjust the rate at which it reads display frames 104 from the frame buffer 122 based, at least in part, on an activity level associated with the display 130. The activity level indicates a likelihood that variations in the framerate associated with the display frames 104 will be perceived by a user of the display system 100. More specifically, the activity level may indicate a degree to which the frame rate impacts user experience. Example factors that may contribute to the activity level include, among other examples, differences between the pixel data 102 associated with successive display frames 104, a rate at which new pixel data 102 is received from the image source 110, a movement or location of a cursor, and a direction of the user's gaze. In some implementations, the activity level may be lower when the display 130 renders images 132 with relatively little motion or user engagement and may be higher when the display 130 renders images 132 with greater motion or user engagement.

In some implementations, the video pipeline 124 may decrease the rate at which it reads display frames 104 from the frame buffer 122 and outputs corresponding display signals 106 to the display 130 when the activity level associated with the display 130 decreases. For example, if the adaptive display interface 120 receives several frames of static pixel data 102 (with little or no variation in the pixel data 102 associated with successive display frames 104), the image 132 on the display 130 may remain relatively unchanged even if the video pipeline 124 outputs the display frames 104 at a lower rate (such as by outputting every $n^{th}$ display frame 104). Similarly, if the user's attention is not focused on the display 130, relatively minor variations between successive display frames 104 may be imperceptible to the user (or have little impact on user experience).

In some other implementations, the video pipeline 124 may increase the rate at which it reads display frames 104 from the frame buffer 122 and outputs corresponding display signals 106 to the display 130 when the activity level associated with the display 130 increases. For example, if the display frames 104 include a significant amount of motion (with substantial variation in the pixel data 102 associated with successive display frames 104), the image 132 may appear choppy (or appear to skip) if the video pipeline 124 outputs the display frames 104 at a lower rate. Similarly, if the user's attention is focused on the display, any variations between successive display frames 104 may be more noticeable to the user (or have greater impact on user experience).

In existing display architectures, dynamic refresh is often used to synchronize the refresh rate of a digital display with the rate at which display frames are generated by an image source. By contrast, the video pipeline 124 of the present implementations may leverage the activity level associated with the display 130 to output display frames 104 less frequently than the rate at which such display frames 104 are generated by the image source 110. In other words, the frame rate associated with the display frames 104 may be lower than the rate at which such display frames 104 become available for output, thereby reducing the load on the frame buffer 122. As such, aspects of the present disclosure may allow the frame buffer 122 to be implemented using lower-bandwidth (or lower-cost) memory architectures or may allow the display 130 to render higher-resolution images 132 compared to existing display architectures.

Figure 2:
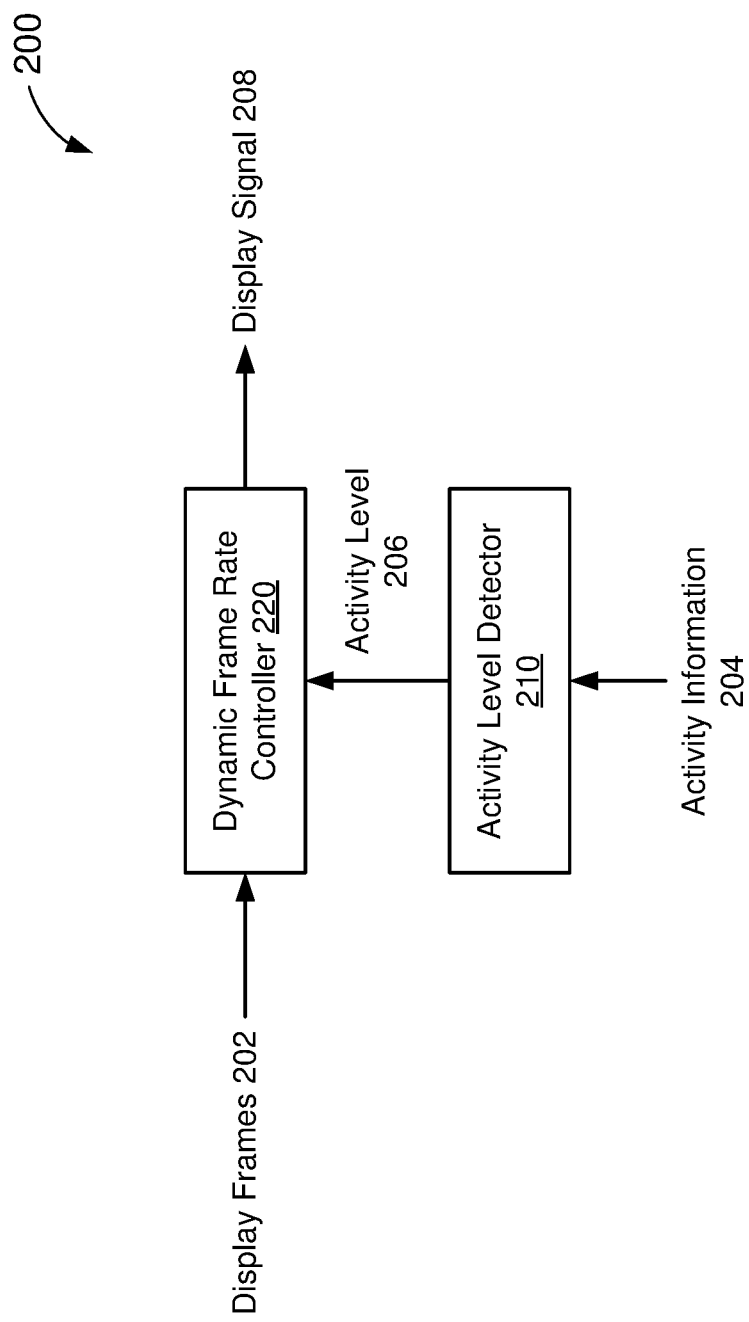
FIG. 2 shows a block diagram of a video pipeline that supports activity-based frame rate adjustment, according to some implementations.

FIG. 2 shows a block diagram of a video pipeline 200 that supports activity-based frame rate adjustment, according to some implementations. In some implementations, the video pipeline 200 may be one example of the video pipeline 124 of FIG. 1. Thus, the video pipeline 200 may be configured to acquire display frames 202 from a frame buffer (such as the frame buffer 122) and output a corresponding set of display signals 208 to a digital display (such as the display 130). The video pipeline 200 includes an activity level detector 210 and a dynamic frame rate controller 220.

In some implementations, the activity level detector 210 may determine an activity level 206 associated with the digital display based on activity information 204 received from an image source (such as the image source 110), the digital display, or any combination thereof. In some aspects, the activity information 204 may indicate an amount of motion or variation between successive display frames 202. In such aspects, the activity information 204 may include a rate at which new pixel data is received from the image source or an amount of variation in the pixel data received from the image source. In some implementations, such activity information 204 may be measured by the activity level detector 210 based on the received pixel data. In some other implementations, such activity information 204 may be measured by another component of the adaptive display interface and subsequently provided to the activity level detector 210.

In some aspects, the activity information 204 may indicate a degree of user engagement with the digital display. In such aspects, the activity information 204 may include a movement or location of a cursor relative to the display or a direction of the user's gaze. In some implementations, the video pipeline 200 may receive cursor information from the image source to be used for rendering a hardware cursor on the digital display. For example, the cursor information may be associated with user inputs provided through one or more peripherals (such as a trackpad or mouse) and may thus indicate whether the user is interacting with the digital display. In some other implementations, the video pipeline 200 may receive gaze information from one or more gaze sensors associated with the image source or the digital display. For example, the gaze sensors may track a position or movement of the user's eyes and may thus indicate whether the user's attention is focused on the digital display.

In some implementations, the activity level detector 210 may determine the activity level 206 associated with the digital display based on one or more factors associated with the activity information 204. Example factors that may contribute to higher activity levels include receiving a high rate of new pixel data, detecting significant variation in the received pixel data, detecting a cursor associated with the digital display, detecting movement of the cursor associated with the digital display, and determining that a user's gaze is focused on the digital display, among other examples. Example factors that may contribute to lower activity levels include receiving a low rate of new pixel data, detecting little variation in the received pixel data, detecting an absence of a cursor, detecting that a cursor is static on the digital display, and determining that a user's gaze is not focused on the digital display, among other examples. In some aspects, the activity level detector 210 may continuously monitor the activity information 204 and dynamically update the activity level 206 based on changes in the activity information 204.

The dynamic frame rate controller 220 is configured to read the display frames 202 from the frame buffer and convert each display frame 202 to a respective set of display signals 208. As described with reference to FIG. 1, the display signals 208 may include data signals, clock signals, and various other synchronization or control signals that can be used to update or refresh an image on the digital display. In some aspects, the dynamic frame rate controller 220 may dynamically adjust the rate at which it reads displays frames 202 from the frame buffer (also referred to as the "target frame rate") based, at least in part, on the activity level 206 determined by the activity level detector 210. In some implementations, the dynamic frame rate controller 220 may increase the target frame rate responsive to the activity level detector 220 indicating an increase in the activity level 206 and may decrease the target frame rate responsive to the activity level detector 220 indicating a decrease in the activity level 206.

Figure 3:
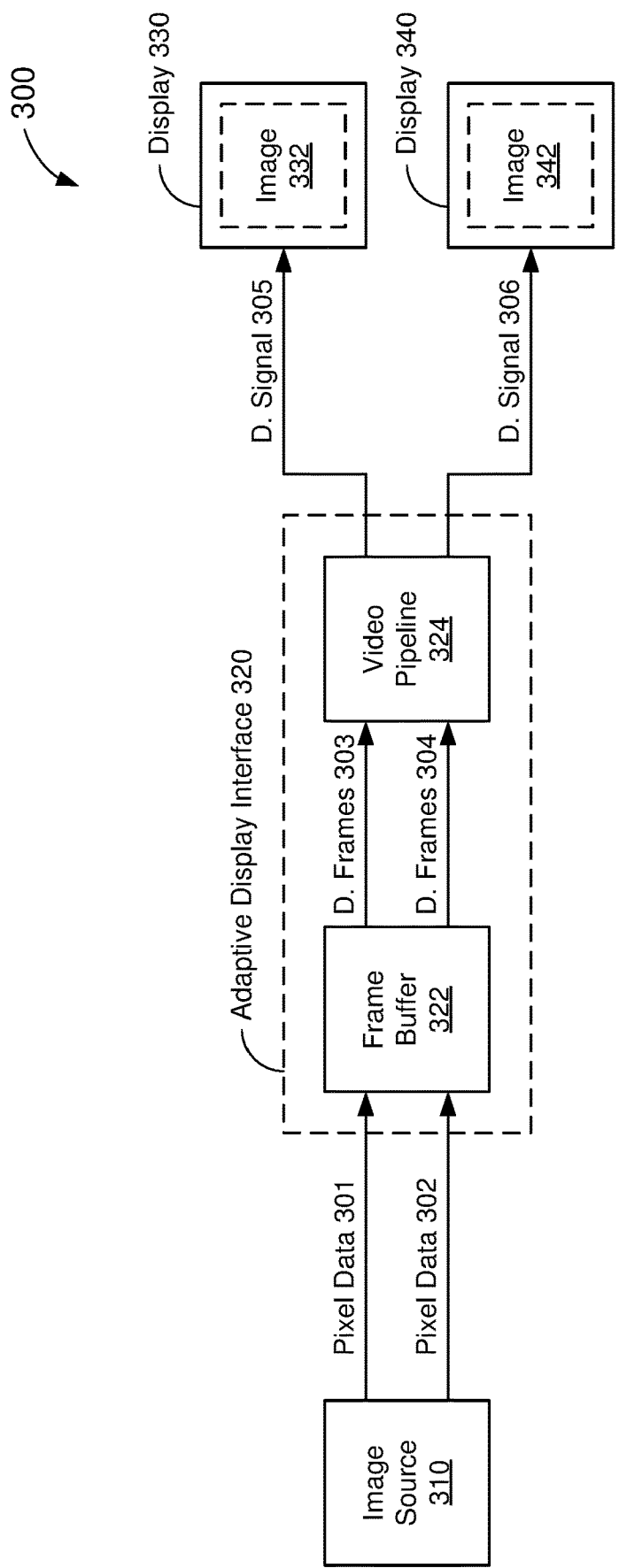
FIG. 3 shows another block diagram of a video display system, according to some implementations.

FIG. 3 shows another block diagram of a video display system 300, according to some implementations. The display system 300 includes an image source 310, an adaptive display interface 320, and multiple displays 330 and 340. More specifically, the image source 310 may communicate via the adaptive display interface 320 to update or refresh a respective digital image on each of the displays 330 and 340. Although only two displays 330 and 340 are shown in the example of FIG. 3, in actual implementations, the adaptive display interface 320 may be coupled to any number of displays.

In some aspects, the image source 310, the adaptive display interface 320, and the displays 330 and 340 may be implemented in (or correspond to) respective devices. For example, the image source 310 may be a computing device (such as a notebook computer, mobile phone, or tablet) and the adaptive display interface 320 may be a universal docking station that can be used to couple the computing device to the displays 330 and 340. In some implementations, the adaptive display interface 320 may be coupled to the image source 310 via a first communication channel and may be coupled to the displays 330 and 340 via second and third communication channels, respectively, each having a greater bandwidth than the first communication channel.

In some implementations, the first communication channel may be a wired medium. As such, the first communication channel may conform to a USB standard, an Ethernet standard (including the IEEE 802.3 family of standards), or various other wired communication standards. In some other implementations, the first communication channel may be a wireless medium. As such, the first communication channel may conform to a WLAN standard (including the IEEE 802.11 family of standards), a Bluetooth® standard (such as defined by the Bluetooth SIG), or various other wireless communication standards. In some implementations, the second communication channel may conform to an HDMI standard, a DP standard, or various other computer display standards.

The image source 310 may be any device or component capable of generating pixel data 301 and 302 that can be rendered or otherwise displayed by a digital display. For example, the pixel data 301 may include color or brightness values to be driven onto respective pixel elements associated with the display 330 and the pixel data 302 may include color or brightness values to be driven onto respective pixel elements associated with the display 340. The image source 310 may generate the pixel data 301 and 302 by performing various rendering or image processing operations. As a result, the rate at which the pixel data 301 and 302 is output by the image source 310 may vary over time. The adaptive display interface 320 converts the pixel data 301 and 302 to display signals 305 and 306, respectively, that can be interpreted by the displays 330 and 340. Each of the displays 330 and 340 may be any digital display device capable of rendering or displaying digital images 332 and 342 based on the display signals 305 and 306, respectively. Example suitable display technologies include LED, OLED, CRT, LCD, and plasma, among other examples.

The adaptive display interface 320 includes a frame buffer 322 and a video pipeline 324. The frame buffer 322 is configured to store or buffer the pixel data 301 and 302 received from the image source 310. More specifically, the frame buffer 322 aggregates (or assembles) the received pixel data 301 and 302 into display frames 303 and 304, respectively. Each display frame 303 may include a set of pixel data 301 to be driven onto each pixel element of the display 330 during a respective update or refresh, and each display frame 304 may include a set of pixel data 302 indicating the pixel values to be driven onto each pixel element of the display 340 during a respective update or refresh. In other words, each display frame 303 and 304 represents a new or updated image 332 and 342, respectively, to be rendered on the displays 330 and 340. The video pipeline 324 reads the display frames 303 and 304 from the frame buffer 322 and converts the display frames 303 to and 304 to respective display signals 305 and 306. For example, each set of display signals 305 and 306 may include data signals, clock signals, and various other synchronization or control signals that can be used to render the images 332 and 342 on the displays 330 and 340, respectively.

In some implementations, each of the displays 330 and 340 may support dynamic refresh (such as VRR or adaptive sync). In other words, the displays 330 and 340 may synchronize their refresh rates with the rate at which the video pipeline 324 outputs the display frames 303 and 304, respectively (as display signals 305 and 306). As described above, by locking the refresh rates of the displays 330 and 340 to the frame rate associated with the display frames 303 and 304, respectively, dynamic refresh allows the video pipeline 324 to control when the displays 330 and 340 will refresh their images 332 and 342, respectively. In other words, the video pipeline 324 has autonomy to decide the frequency with which it reads display frames 303 and 304 out from the frame buffer 322 (rather than being constrained by the refresh rates of the displays 330 and 340).

In some aspects, the video pipeline 324 may dynamically adjust the rate at which it reads display frames 303 from the frame buffer 322 based, at least in part, on an activity level associated with the display 330. As described with reference to FIGS. 1 and 2, the activity level associated with the display 330 may be lower when the display 330 renders images 332 with relatively little motion or user engagement and may be higher when the display 330 renders images 332 with greater motion or user engagement. In some implementations, the video pipeline 324 may increase the rate at which it reads display frames 303 from the frame buffer 322, and outputs corresponding display signals 305 to the display 330, when the activity level associated with the display 330 increases. In some other implementations, the video pipeline 324 may decrease the rate at which it reads display frames 303 from the frame buffer 322, and outputs corresponding display signals 305 to the display 330, when the activity level associated with the display 330 decreases.

In some aspects, the video pipeline 324 also may dynamically adjust the rate at which it reads display frames 304 from the frame buffer 322 based, at least in part, on an activity level associated with the display 340. As described with reference to FIGS. 1 and 2, the activity level associated with the display 340 may be lower when the display 340 renders images 342 with relatively little motion or user engagement and may be higher when the display 340 renders images 342 with greater motion or user engagement. In some implementations, the video pipeline 324 may increase the rate at which it reads display frames 304 from the frame buffer 322, and outputs corresponding display signals 306 to the display 340, when the activity level associated with the display 340 increases. In some other implementations, the video pipeline 324 may decrease the rate at which it reads display frames 304 from the frame buffer 322, and outputs corresponding display signals 306 to the display 340, when the activity level associated with the display 340 decreases.

Still further, in some implementations, the video pipeline 324 may balance the frame rate associated with the display frames 303 and the frame rate associated with the display frames 304 based on a bandwidth associated with the frame buffer 322. For example, aspects of the present disclosure recognize that, due to bandwidth limitations of the frame buffer 322, the video pipeline 324 may not be able to read the display frames 303 and 304 from the frame buffer 322 at a desired rate (such as the rate at which they become available) if the activity levels associated with the displays 330 and 340 are both high. In some implementations, the video pipeline 324 may prioritize one of the displays 330 or 340 over the other based on their respective activity levels. For example, the video pipeline 324 may read the display frames 303 from the frame buffer 322 at a higher rate than the display frames 304 if the activity level associated with the display 330 is higher than the activity level associated with the display 340. As such, the video pipeline 324 may apportion the bandwidth of the frame buffer 322 to each of the displays 330 and 340 according to the activity levels associated therewith.

Figure 4:
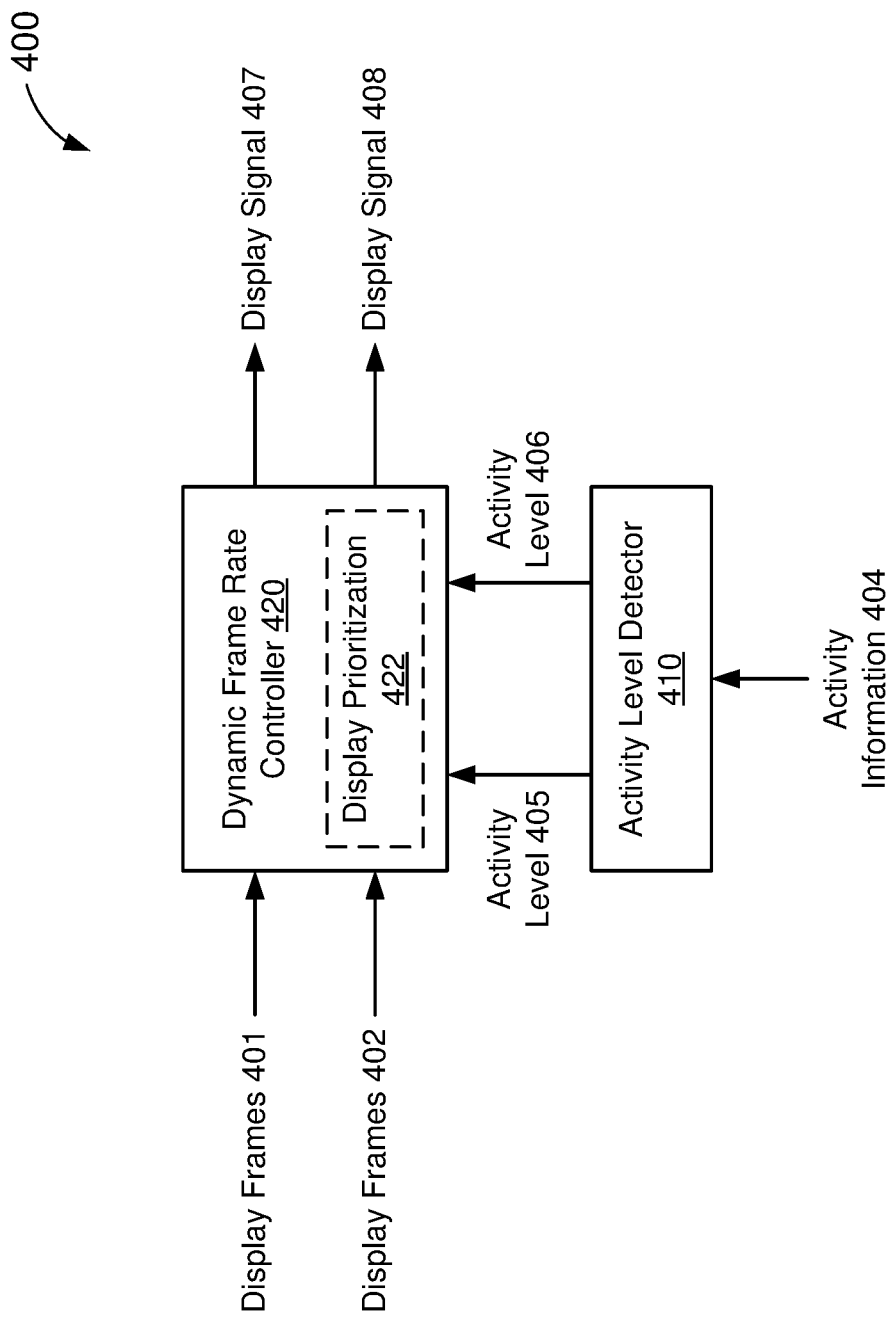
FIG. 4 shows another block diagram of a video pipeline that supports activity-based frame rate adjustment, according to some implementations.

FIG. 4 shows another block diagram of a video pipeline 400 that supports activity-based frame rate adjustment, according to some implementations. In some implementations, the video pipeline 400 may be one example of the video pipeline 324 of FIG. 3. Thus, the video pipeline 400 may be configured to acquire display frames 401 and 402 from a frame buffer (such as the frame buffer 322) and output corresponding display signals 407 and 408 to respective digital displays (such as the displays 330 and 340). The video pipeline 400 includes an activity level detector 410 and a dynamic frame rate controller 420.

In some implementations, the activity level detector 410 may determine a respective activity level 405 and 406 associated with each digital display based on activity information 404 received from an image source (such as the image source 310), the digital displays, or any combination thereof. In some aspects, the activity information 404 may indicate an amount of motion or variation between successive display frames 401 and may further indicate an amount of motion or variation between successive display frames 402. In such aspects, the activity information 404 may include a rate at which new pixel data is received from the image source or an amount of variation in the pixel data received from the image source. In some implementations, such activity information 404 may be measured by the activity level detector 410 based on the received pixel data. In some other implementations, such activity information 404 may be measured by another component of the adaptive display interface and subsequently provided to the activity level detector 410.

In some aspects, the activity information 404 may indicate a degree of user engagement with each digital display. In such aspects, the activity information 404 may include a movement or location of a cursor relative to each display or a direction of the user's gaze. In some implementations, the video pipeline 400 may receive cursor information from the image source to be used for rendering a hardware cursor on one of the digital displays. For example, the cursor information may be associated with user inputs provided through one or more peripherals (such as a trackpad or mouse) and may thus indicate whether the user is interacting with a particular display. In some other implementations, the video pipeline 400 may receive gaze information from one or more gaze sensors associated with the image source or the digital displays. For example, the gaze sensors may track a position or movement of the user's eyes and may thus indicate whether the user's attention is focused on a particular digital display.

In some implementations, the activity level detector 410 may determine the activity levels 405 and 406 associated with each digital display based on one or more factors associated with the activity information 404. Example factors that may contribute to higher activity levels for a particular display include receiving a high rate of new pixel data, detecting significant variation in the received pixel data, detecting a cursor associated with the digital display, detecting movement of the cursor associated with the digital display, and determining that a user's gaze is focused on the digital display, among other examples. Example factors that may contribute to lower activity levels for a particular display include receiving a low rate of new pixel data, detecting little variation in the received pixel data, detecting an absence of a cursor, detecting that a cursor is static on the digital display, and determining that a user's gaze is not focused on the digital display, among other examples. In some aspects, the activity level detector 410 may continuously monitor the activity information 404 and dynamically update the activity levels 405 and 406 based on changes in the activity information 404.

The dynamic frame rate controller 420 is configured to read the display frames 401 and 402 from the frame buffer and convert the display frames 401 and 402 to respective display signals 407 and 408, respectively. As described with reference to FIG. 1, the display signals 407 and 408 may include data signals, clock signals, and various other synchronization or control signals that can be used to update or refresh an image on the digital display. In some aspects, the dynamic frame rate controller 420 may dynamically adjust the target frame rate at which it reads displays frames 401 and 402 from the frame buffer based on the activity levels 405 and 406, respectively, determined by the activity level detector 410. In some implementations, the dynamic frame rate controller 420 may increase the target frame rates associated with the display frames 401 or 402 responsive to the activity level detector 410 indicating an increase in the activity level 405 or 406, respectively, and may decrease the target frame rates associated with the display frames 401 or 402 responsive to the activity level detector 410 indicating a decrease in the activity level 405 or 406, respectively.

When possible, the dynamic frame rate controller 420 retrieves the display frames 401 and 402 at the target frame rates associated with the activity levels 405 and 406, respectively. However, aspects of the present disclosure recognize that the maximum achievable frame rates associated with the display frames 401 and 402 may be limited by the bandwidth of the frame buffer. Thus, in some aspects, the dynamic frame rate controller 420 may include a display prioritization component 422 that balances the frame rate associated with the display frames 401 and the frame rate associated with the display frames 402 based on a bandwidth of the frame buffer. In some implementations, the display prioritization component 422 may prioritize the display frames 401 or 402 based on the activity levels 405 and 406. For example, the display prioritization component 422 may retrieve the display frames 401 at a higher rate than the display frames 402 if the activity level 405 is higher than the activity level 406. On the other hand, the display prioritization component 422 may retrieve the display frames 402 at a higher rate than the display frames 401 if the activity level 406 is higher than the activity level 405.

In some implementations, the display prioritization component 422 may further balance various other considerations when determining which of the display frames 401 or 402 to prioritize during any given period of time. For example, aspects of the present disclosure recognize that many digital displays have a minimum required refresh rate. As such, the video pipeline 400 must at least retrieve the display frames 401 and 402 at frame rates greater than or equal to the minimum refresh rates of their associated displays (even if the activity levels 405 and 406 are low). In some implementations, the display prioritization component 422 may schedule the retrieval of display frames 401 and 402 to satisfy the refresh rate requirements of their associated displays without overloading the bandwidth of the frame buffer at any given time. For example, even if the activity level 405 is very high and the activity level 406 is very low, the display prioritization component 422 may avoid allocating the maximum available bandwidth for the retrieval of the display frames 401 during periods in which a display frame 402 must be retrieved to satisfy a minimum refresh rate.

Figure 5:
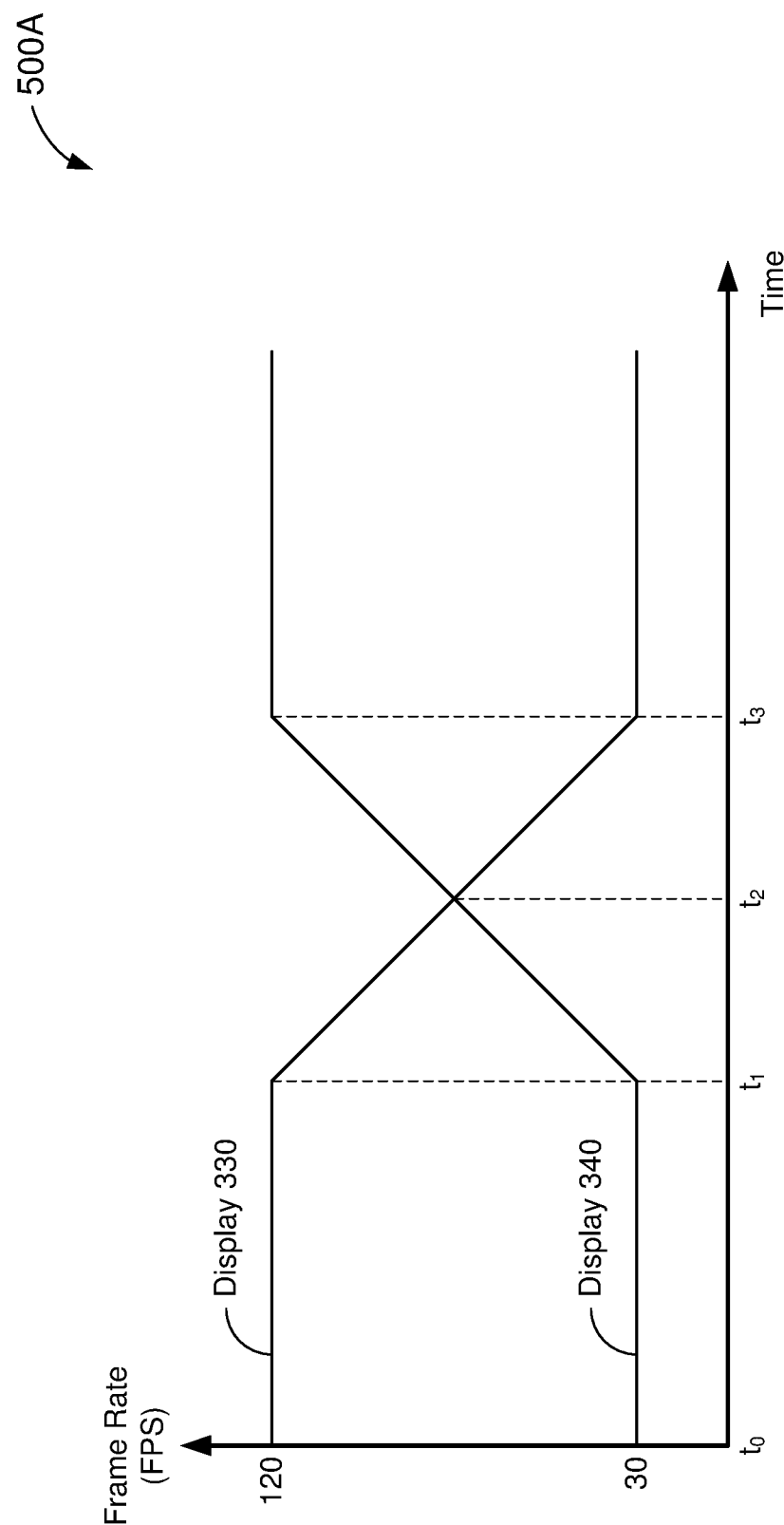
FIG. 5 shows a timing diagram depicting an example activity-based frame rate adjustment operation, according to some implementations.

FIG. 5 shows a timing diagram 500 depicting an example activity-based frame rate adjustment operation, according to some implementations. In some implementations, the example operation may be performed by the adaptive display interface 320 to dynamically adjust the frame rate at which the display frames 303 and 304 are output to the displays 330 and 340, respectively (as the display signals 305 and 306).

Between times $t_0$ and $t_1$, the display 330 receives the display frames 303 at a frame rate equal to 120 frames per second (FPS) whereas the display 340 receives the display frames 304 at a frame rate equal to 30 FPS. As such, the activity level associated with the display 330 may be very high and the activity level associated with the display 340 may be very low (or at least significantly lower than the activity level associated with the display 330). For example, the display 330 may render images with significant motion or user engagement whereas the display 340 may render images with relatively little motion or user engagement between times $t_0$ and $t_1$.

Between times $t_1$ and $t_2$, the adaptive display interface reduces the frame rate of the display frames 303 output to the display 330 while increasing the frame rate of the display frames 304 output to the display 340. As such, the activity level associated with the display 330 may be decreasing or the activity level associated with the display 340 may be increasing (or both). For example, the images rendered by the display 330 may become static or exhibit significantly less motion between times $t_1$ and $t_2$.

Between times $t_2$ and $t_3$, the adaptive display interface further reduces the frame rate of the display frames 303 output to the display 330 while continuing to increase the frame frate of the display frames 304 output to the display 340. As such, the activity level associated with the display 330 may continue to decrease (below the activity level associated with the display 340) or the activity level associated with the display 340 may continue to increase (beyond the activity level associated with the display 330). For example, the images rendered by the display 340 may exhibit more motion between times $t_2$ and $t_3$.

At time $t_3$ (and beyond), the display 330 receives the display frames 303 at a frame rate equal to 30 FPS whereas the display 340 receives the display frames 304 at a frame rate equal to 120 FPS. As such, the activity level associated with the display 330 may be very low and the activity level associated with the display 340 may be very high (or at least significantly higher than the activity level associated with the display 330). For example, the display 330 may render images with relatively little motion or user engagement whereas the display 340 may render images with significant motion or user engagement $t_3$ and beyond.

Figure 6:
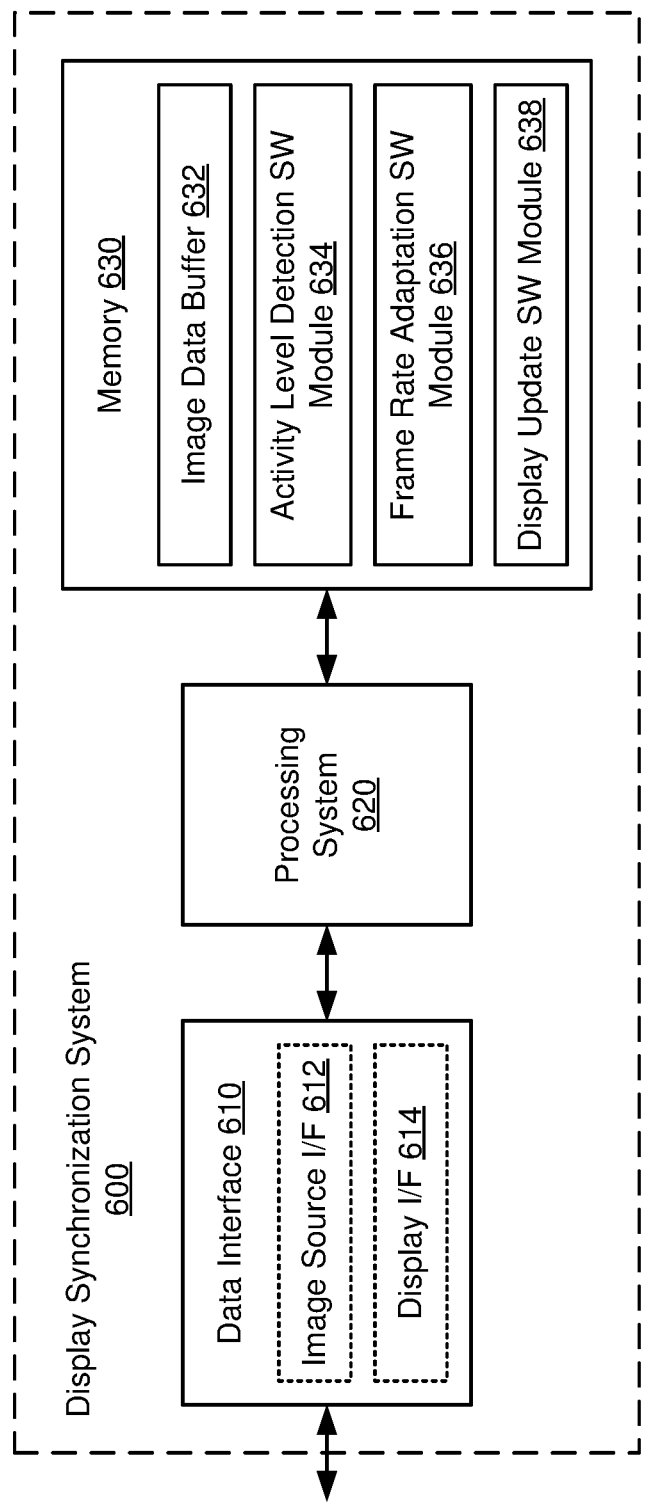
FIG. 6 shows a block diagram of a display synchronization system, according to some implementations.

FIG. 6 shows a block diagram of a display synchronization system 600, according to some implementations. The display synchronization system 600 may be one example of any of the adaptive display interfaces 120 or 320 of FIGS. 1 and 3, respectively. More specifically, the display synchronization system 600 may be configured to dynamically update or refresh one or more displays based on an activity level associated with each display.

In some implementations, the display synchronization system 600 may include a data interface 610, a processing system 620, and a memory 630. The data interface 610 is configured to receive pixel data from an image source or host device and provide display updates to one or more displays. In some aspects, the data interface 610 may include an image source interface (I/F) 612 to communicate with the image source or host device and a display interface 614 to communicate with the one or more displays.

The memory 630 may include an image data buffer 632 that is configured to aggregate the pixel data into a series of frames. The memory 630 also may include a non-transitory computer-readable medium (including one or more nonvolatile memory elements, such as EPROM, EEPROM, Flash memory, a hard drive, and the like) that may store at least the following software (SW) modules:

an activity level detection SW module 634 to obtain activity information indicating an activity level associated with a display;

a frame rate adaptation SW module 636 to determine a target frame rate based at least in part on the activity information; and a display update SW module 638 to output the series of frames to the display at the target frame rate.

Each software module includes instructions that, when executed by the processing system 620, causes the display synchronization system 600 to perform the corresponding functions.

The processing system 620 may include any suitable one or more processors capable of executing scripts or instructions of one or more software programs stored in the encoder 600 (such as in memory 630). For example, the processing system 620 may execute the activity level detection SW module 634 to obtain activity information indicating an activity level associated with a display. The processing system 620 also may execute the frame rate adaptation SW module 636 to determine a target frame rate based at least in part on the activity information. Further, the processing system 620 may execute the display update SW module 638 to output the series of frames to the display at the target frame rate.

Figure 7:
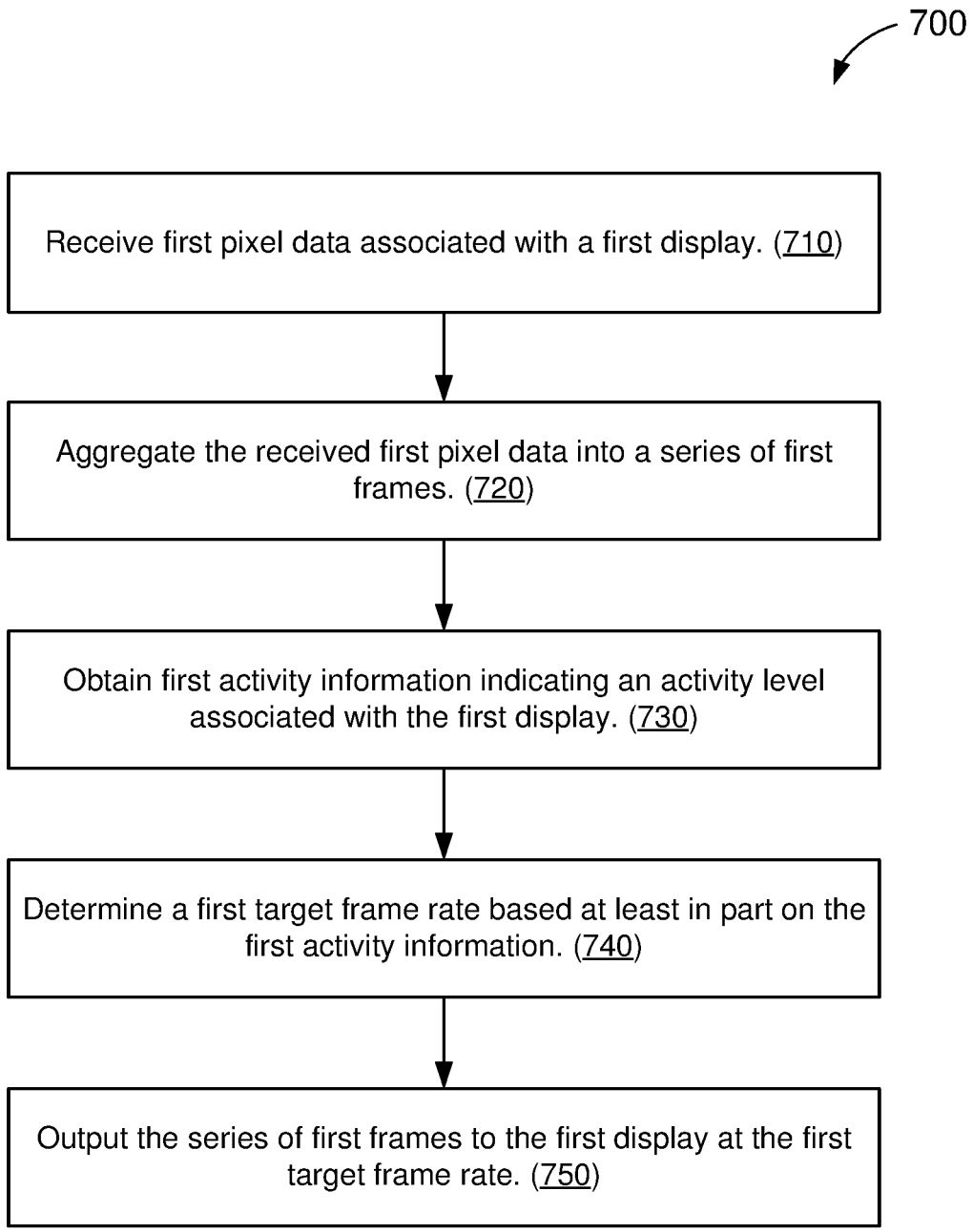
FIG. 7 shows an illustrative flowchart depicting an example operation for processing display updates, according to some implementations.

FIG. 7 shows an illustrative flowchart depicting an example operation 700 for processing display updates, according to some implementations. In some implementations, the example operation 700 may be performed by display synchronization system such as any of the adaptive display interfaces 120 or 320 of FIGS. 1 and 3, respectively.

The display synchronization system may receive first pixel data associated with a first display (710). The display synchronization system may aggregate the received first pixel data into a series of first frames (720). The display synchronization system may further obtain first activity information indicating an activity level associated with the first display (730). In some implementations, the first activity information may indicate a movement or location of a cursor relative to the first display, a rate at which the first pixel data is received, or a direction of gaze of a user associated with the first display.

The display synchronization system also may determine a first target frame rate based at least in part on the first activity information (740). In some implementations, the first target frame rate may be different than a rate at which the first pixel data is aggregated into the series of first frames. In some implementations, the first target frame rate may be further determined based on a bandwidth associated with a frame buffer in which the first pixel data is aggregated. The display synchronization system may further output the series of first frames to the first display at the first target frame rate (750).

In some aspects, the display synchronization system may further obtain updated activity information indicating changes to the activity level associated with the first display and adjust the first target frame rate based at least in part on the updated activity information. In some implementations, the adjusting of the first target frame rate may include increasing the first target frame rate responsive to the first activity information indicating an increase in the activity level associated with the first display and decreasing the first target frame rate responsive to the first activity information indicating a decrease in the activity level associated with the first display.

In some aspects, the display synchronization system may further receive second pixel data associated with a second display; aggregate the received second pixel data into a series of second frames; obtain second activity information indicating an activity level associated with the second display; determine a second target frame rate based at least in part on the second activity information; and output the series of second frames to the second display at the second target frame rate.

In some implementations, the first target frame rate and the second target frame rate may be further determined based on refresh rate requirements of the first and second displays. In some aspects. the first target frame rate may be further determined based on the second activity information and the second target frame rate may be further determined based on the first activity information.

In some implementations, the determining of the second target frame rate may include determining that the activity level associated with the second display is lower than the activity level associated with the first display and selecting a lower frame rate for the second target frame rate than the first target frame rate based on determining that the activity level associated with the second display is lower than the activity level associated with the first display.

In some implementations, the determining of the first target frame rate may include determining that the activity level associated with the first display is lower than the activity level associated with the second display and selecting a lower frame rate for the first target frame rate than the second target frame rate based on determining that the activity level associated with the first display is lower than the activity level associated with the second display.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of processing display updates, comprising:
   receiving first pixel data associated with a first display having a refresh rate that dynamically adapts to a frame rate at which display frames are provided to the first display;
   aggregating, in a frame buffer, the received first pixel data into a series of first frames;
   obtaining first activity information indicating an activity level associated with the first display;
   determining a first target frame rate for outputting the series of first frames to the first display based at least in part on the first activity information and a bandwidth associated with the frame buffer; and
   controlling the refresh rate of the first display based on outputting the series of first frames to the first display at the first target frame rate.

2. The method of claim 1, wherein the first target frame rate is different than a rate at which the first pixel data is aggregated into the series of first frames.

3. The method of claim 1, wherein the first activity information indicates a movement or location of a cursor relative to the first display, a rate at which the first pixel data is received, or a direction of gaze of a user associated with the first display.

4. The method of claim 1, further comprising:
   obtaining updated activity information indicating changes to the activity level associated with the first display; and
   adjusting the first target frame rate based at least in part on the updated activity information.

5. The method of claim 4, wherein the adjusting of the first target frame rate comprises:
   increasing the first target frame rate responsive to the first activity information indicating an increase in the activity level associated with the first display; and
   decreasing the first target frame rate responsive to the first activity information indicating a decrease in the activity level associated with the first display.

6. The method of claim 1, further comprising:
   receiving second pixel data associated with a second display;
   aggregating the received second pixel data into a series of second frames;
   obtaining second activity information indicating an activity level associated with the second display;
   determining a second target frame rate based at least in part on the second activity information; and
   outputting the series of second frames to the second display at the second target frame rate.

7. The method of claim 6, wherein the first target frame rate is further determined based on the second activity information and the second target frame rate is further determined based on the first activity information.

8. The method of claim 7, wherein the determining of the second target frame rate comprises:
   determining that the activity level associated with the second display is lower than the activity level associated with the first display; and
   selecting a lower frame rate for the second target frame rate than the first target frame rate based on determining that the activity level associated with the second display is lower than the activity level associated with the first display.

9. The method of claim 7, wherein the determining of the first target frame rate comprises:
  determining that the activity level associated with the first display is lower than the activity level associated with the second display; and
  selecting a lower frame rate for the first target frame rate than the second target frame rate based on determining that the activity level associated with the first display is lower than the activity level associated with the second display.

10. The method of claim 6, wherein the first target frame rate and the second target frame rate are further determined based on refresh rate requirements of the first and second displays.

11. A display synchronization system, comprising:
  a processing system; and
  a memory storing instructions that, when executed by the processing system, causes the display interface to:
    receive first pixel data associated with a first display having a refresh rate that dynamically adapts to a frame rate at which display frames are provided to the first display;
    aggregate, in a frame buffer, the received first pixel data into a series of first frames;
    obtain first activity information indicating an activity level associated with the first display;
    determine a first target frame rate for outputting the series of first frames to the first display based at least in part on the first activity information and a bandwidth associated with the frame buffer; and
    control the refresh rate of the first display based on outputting the series of first frames to the first display at the first target frame rate.

12. The display synchronization system of claim 11, wherein the first target frame rate is different than a rate at which the first pixel data is aggregated into the series of first frames.

13. The display synchronization system of claim 11, wherein the first activity information indicates a movement or location of a cursor relative to the first display, a rate at which the first pixel data is received, or a direction of gaze of a user associated with the first display.

14. The display synchronization system of claim 11, wherein execution of the instructions further causes the display synchronization system to:
  obtain updated activity information indicating changes to the activity level associated with the first display; and
  adjust the first target frame rate based at least in part on the updated activity information.

15. The display synchronization system of claim 14, wherein the adjusting of the first target frame rate comprises:
  increasing the first target frame rate responsive to the first activity information indicating an increase in the activity level associated with the first display; and
  decreasing the first target frame rate responsive to the first activity information indicating a decrease in the activity level associated with the first display.

16. The display synchronization system of claim 11, wherein execution of the instructions further causes the display synchronization system to:
  receive second pixel data associated with a second display;
  aggregate the received second pixel data into a series of second frames;
  obtain second activity information indicating an activity level associated with the second display;
  determine a second target frame rate based at least in part on the second activity information; and
  output the series of second frames to the second display at the second target frame rate.

17. The display synchronization system of claim 16, wherein the first target frame rate is further determined based on the second activity information and the second target frame rate is further determined based on the first activity information.

18. The display synchronization system of claim 16, wherein the first target frame rate and the second target frame rate are further determined based on refresh rate requirements of the first and second displays.

* * * * *